United States Patent [19]
Meuschke et al.

[11] Patent Number: 5,384,812
[45] Date of Patent: Jan. 24, 1995

[54] INTEGRATED HEAD PACKAGE CABLE CARRIER FOR A NUCLEAR POWER PLANT

[75] Inventors: Robert E. Meuschke, Monroeville; Daniel M. Trombola, Murrysville, both of Pa.

[73] Assignee: Westinghouse Electric Corporation, Pittsburgh, Pa.

[21] Appl. No.: 213,891

[22] Filed: Mar. 16, 1994

[51] Int. Cl.⁶ ............................................. G21C 19/00
[52] U.S. Cl. ..................................... 376/260; 376/263
[58] Field of Search ...................... 376/260, 263, 463

[56] References Cited

U.S. PATENT DOCUMENTS

| | | | |
|---|---|---|---|
| 4,158,599 | 6/1979 | Adrews et al. | 376/263 |
| 4,302,290 | 11/1981 | Mazur et al. | 376/260 |
| 4,830,814 | 5/1989 | Altman | 376/263 |

*Primary Examiner*—Daniel D. Wasil

[57] ABSTRACT

A cabling arrangement is provided for a nuclear reactor located within a containment. Structure inside the containment is characterized by a wall having a near side surrounding the reactor vessel defining a cavity, an operating deck outside the cavity, a sub-space below the deck and on a far side of the wall spaced from the near side, and an operating area above the deck. The arrangement includes a movable frame supporting a plurality of cables extending through the frame, each connectable at a first end to a head package on the reactor vessel and each having a second end located in the sub-space. The frame is movable, with the cables, between a first position during normal operation of the reactor when the cables are connected to the head package, located outside the sub-space proximate the head package, and a second position during refueling when the cables are disconnected from the head package, located in the sub-space. In a preferred embodiment, the frame straddles the top of the wall in a substantially horizontal orientation in the first position, pivots about an end distal from the head package to a substantially vertically oriented intermediate position, and is guided, while remaining about vertically oriented, along a track in the sub-space to the second position.

19 Claims, 6 Drawing Sheets

INTEGRATED HEAD PACKAGE CABLE CARRIER FOR A NUCLEAR POWER PLANT

GOVERNMENT CONTRACT

The government of the United States of America has rights in this invention pursuant to Cooperative Agreement DE-FC02-92-NE342657 awarded by the U.S. Department of Energy to the Advanced Reactor Corporation.

BACKGROUND OF THE INVENTION

1. Field of the Invention

This invention relates to cable carriers for cables connecting to an integrated head package of a nuclear reactor, and, in particular, to cable carriers which permit all of the power and control cables to be removed from the integrated head package at one time and that stores them in a protected environment leaving an operating floor in the containment completely unobstructed for maintenance and refueling operations.

2. Description of the Prior Art

Prior to refueling a nuclear powered reactor, it is necessary to remove and store the integrated head package (IHP). The IHP consists of a reactor vessel head, the control rod drive mechanisms (CRDM's), the control rod position indicators (RPI's), the cooling fans and other associated hardware. An IHP for a nuclear reactor is described in commonly owned U.S. Pat. No. 4,830,814, to Altman, included herein by reference. In preparation for removal of the IHP, all of the power and control cables that run to the CRDM's or RPI's from control cabinets located in the containment building, along with other electrical instrumentation cables must be disconnected between connector plates that are mounted on the IHP.

Once they are disconnected from the IHP, these cables must be safely stored during refueling. In present plants, the cables are stored individually in various locations or are removed and stored in special articulating cable trays. The cable trays and cables take up valuable room on the operating deck and are subject to damage from operating personnel during refueling operations.

Therefore, there is a need for a cabling arrangement for nuclear reactors wherein the cables can be removed from the operating floor during the refueling operation. There is also a need for a cabling arrangement for an IHP that protects the cables from accidental damage during normal operation of the reactor and during refueling.

SUMMARY OF THE INVENTION

These and other needs are met according to the invention in a cabling arrangement that includes a frame or cable carrier supporting power and instrumentation control cables connected to a head package on a nuclear reactor vessel. The frame can be withdrawn from the reactor vessel area to a remote area to clear an operating area near the reactor vessel.

The cable carrier can include a connector plate, through which each of the cables pass, located near the head package for keeping the cables spaced apart from each other. The cable carrier can also include, for each cable, a mechanism for retracting a short length of cable extending beyond the connector plate, including the cable connector, towards the connector plate.

It is an object of the invention to provide a cable carrier for a nuclear reactor vessel that, after disconnection of the cables from the reactor head, can be moved, with the cables, to an area remote from the reactor vessel such that an area on an operating deck around the reactor vessel is cleared.

It is another object of the invention to provide a cable carrier for a nuclear reactor that affords maximum protection for the cables during refueling and maintenance operations.

It is another object of the invention to provide a cabling arrangement for a nuclear reactor wherein the cables can be speedily disconnected and reconnected to the IHP.

These and other objects of the invention will be more fully understood from the following description of the invention with reference to the accompanying drawings.

DETAILED DESCRIPTION OF THE INVENTION

Figure 1:
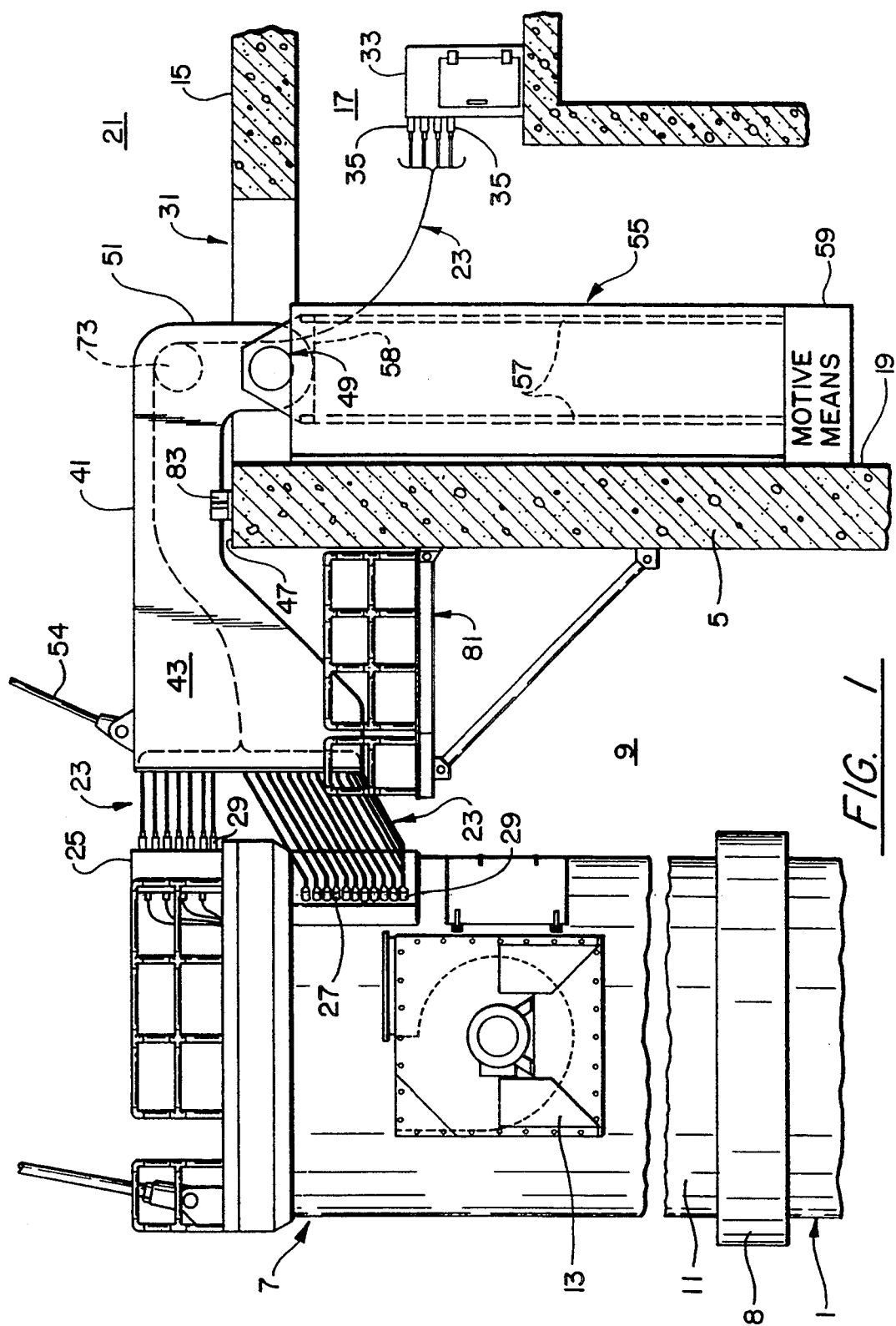
FIG. 1 is a schematic elevation view of a cabling arrangement according to the invention illustrating a frame in a first position carrying cables connected to an IHP of a nuclear reactor vessel.
Figure 2:
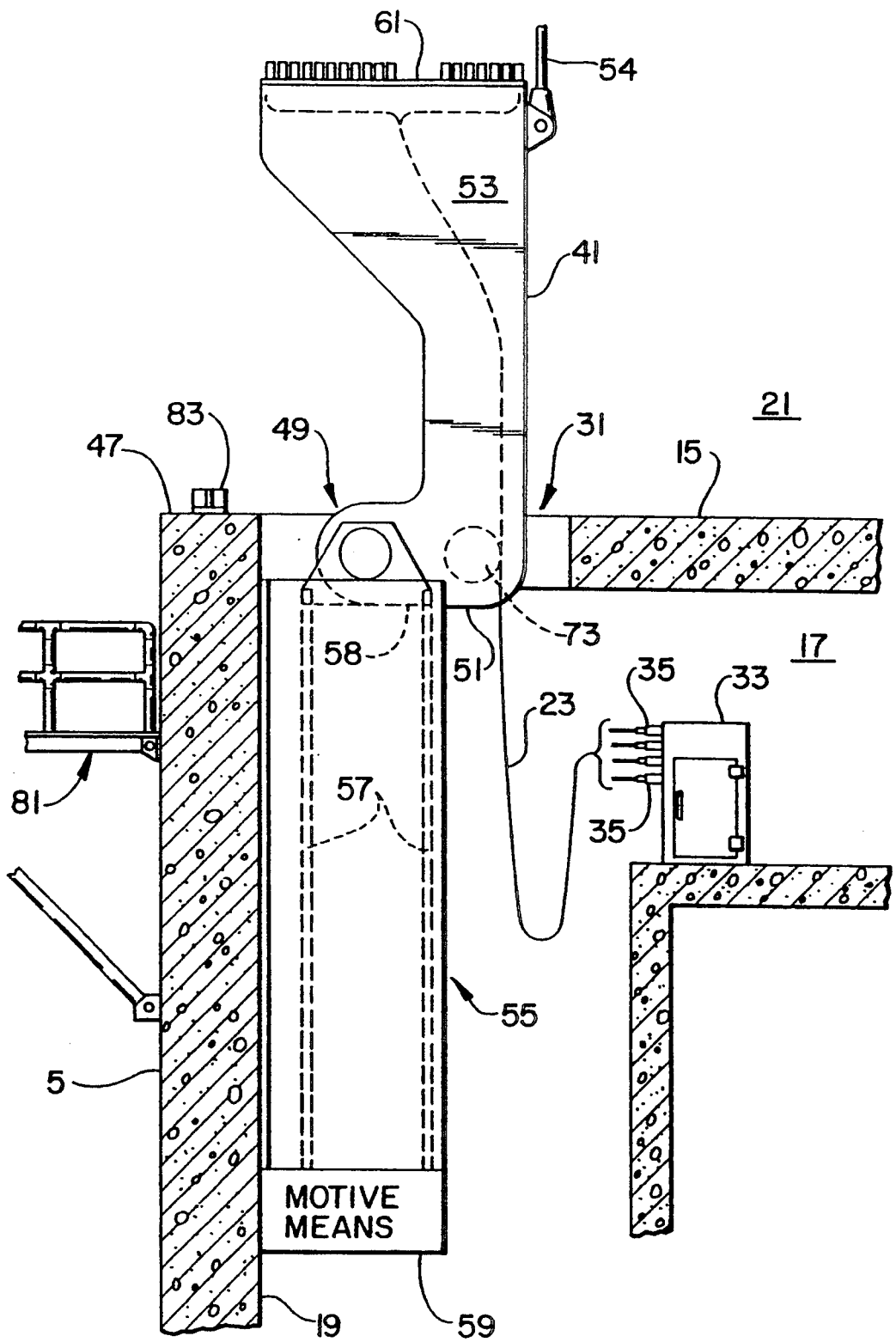
FIG. 2 shows the frame of FIG. 1 in an intermediate position.
Figure 3:
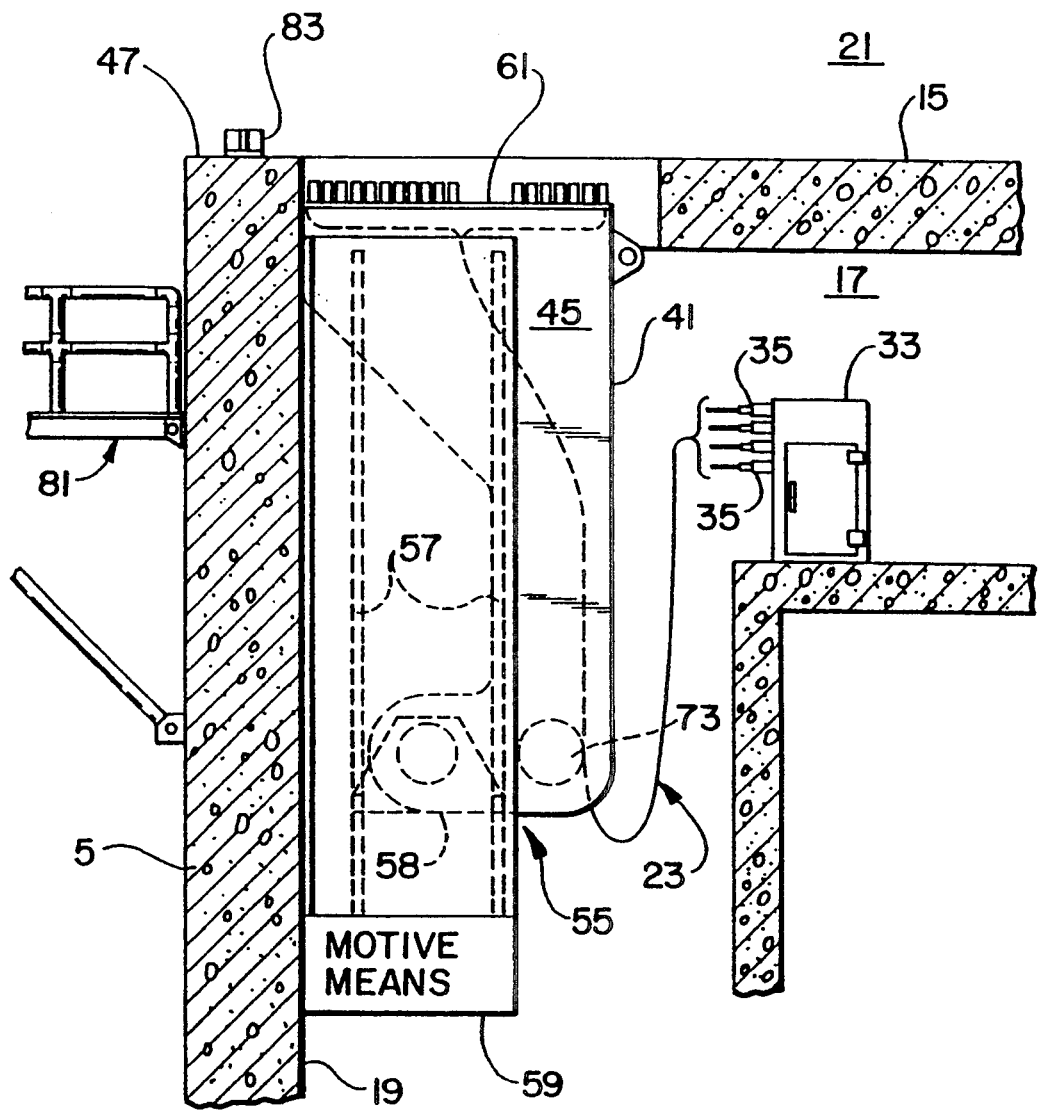
FIG. 3 shows the cable carrier of FIGS. 1 and 2 retracted to a second position below the operating deck in the containment.

Referring now to the figures, wherein similar structures common to each figure will be referenced by the same reference numbers throughout this specification for simplicity of exposition, a cabling arrangement of the present invention for a nuclear reactor vessel is illustrated in three different positions in FIGS. 1-3. Nuclear reactor vessel 1 is located within a containment (not shown). A structural wall 5 within the containment spaced from reactor vessel 1 and extending to about the elevation of an IHP 7 sealed to the top of reactor vessel 1 at flange 8 defines a cavity 9 that is filled with water during refueling of the reactor. IHP 7 consists of a reactor vessel head 11, control rod drive mechanisms (CRDM's) (not shown), control rod position indicators (RPI's) (not shown), cooling fans 13 and other associated hardware. An operating deck 15, typically supported by wall 5 and located outside cavity 9 distal from reactor vessel 1, separates a sub—space 17 below deck 15 on a far side 19 of wall 5 from an operating area 21 above deck 15.

Power, control and other electrical cables 23 to the CRDM's or RPI's are run from connector plates 25, 27 mounted on IHP 7 where cables 23 are connected at their first ends 29, through an opening 31 in deck 15, and then to control panels 33 located in sub-space 17 where cables 23 are connected at their second ends 35 (FIG. 1). Cavity 9 is typically filled with water during refueling of reactor vessel 1 when reactor vessel head 11 is removed. Prior to refueling, first ends 29 of all cables 23 must be disconnected from IHP 7 and removed from the area around cavity 9, and preferably removed into sub-space 17 (FIG. 3).

A movable frame 41 is provided to facilitate removal of cables 23 from an area around reactor vessel 1 and from operating area 21 before refueling, and also to facilitate reconnection of cables 23 to IHP 7 after refueling and before start-up of the reactor. Frame 41 supports a length of each cable extending through frame 41, and is movable, with cables 23, between a first position 43 outside sub-space 17 proximate head package 7 (FIG. 1) and a second position 45 in sub-space 17 (FIG. 3). Frame 41 in first position 43 is oriented generally horizontally and straddles a top 47 of wall 5. In second position 45, frame 41 is oriented about vertically proximate far side 19 of wall 5.

A pivot arrangement 49 near a first end 51 of frame 41 distal from reactor vessel 1 and overhanging sub-space 17 permits frame 41 to pivot between first position 43 and a substantially vertically oriented intermediate position 53 (FIG. 2). Frame 41 can be moved between first position 43 and intermediate position 53 by any of a variety of mechanisms known in the mechanical arts. For example, frame 41 can be hoisted and lowered with removable cables 54 attached to an electrically powered overhead winch (not shown). Frame 41, while vertically oriented, is guided through opening 31 along a predetermined path between intermediate position 53 and second position 45 by a guide mechanism 55. Guide mechanism 55 can include, preferably, a track 57 fixed in an about vertical orientation proximate distal side 19 of wall 5 and means 58 located near first end 51 of frame 41 engaging track 57 such that movement of frame 41 is restricted to the predetermined path parallel to track 57 between the intermediate position 53 and second position 45. Frame 41 can be raised and lowered into sub-space 17 by the same mechanism that moves frame 41 between first position 43 and second position 45, or guide mechanism 55 can further include a separate motive system 59 operably connected to the frame for providing a motive force for lifting, or lifting and lowering, the frame between second position 45 and intermediate position 53. The motive system can be powered by any number of standard modes of powering lift systems, such as, for example, electric motors, hydraulics, and pneumatics, that are found in the elevator and forklift arts.

Figure 4:
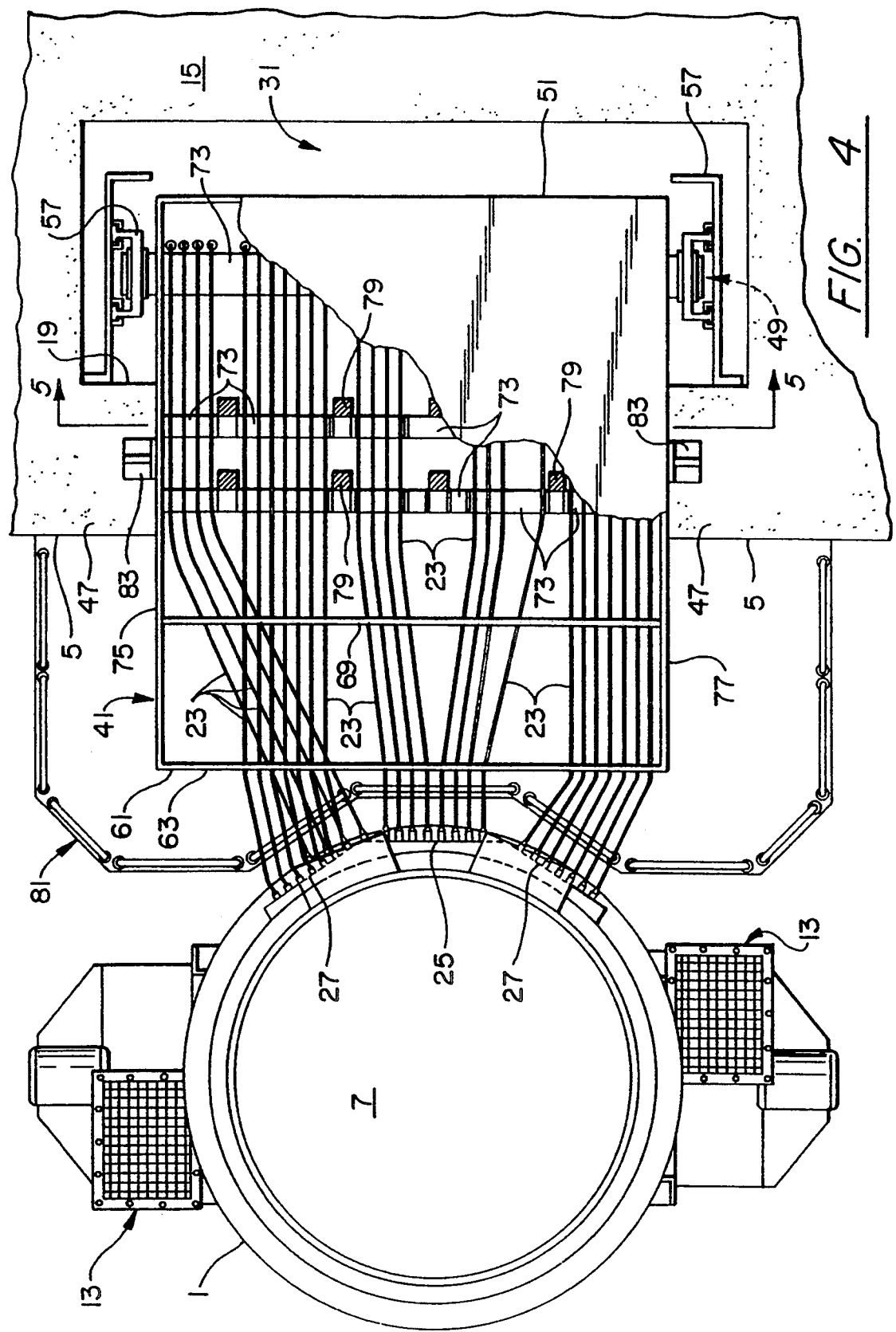
FIG. 4 is a plan view of the cabling arrangement illustrated in FIG. 1, showing a partial section of the frame.
Figure 5:
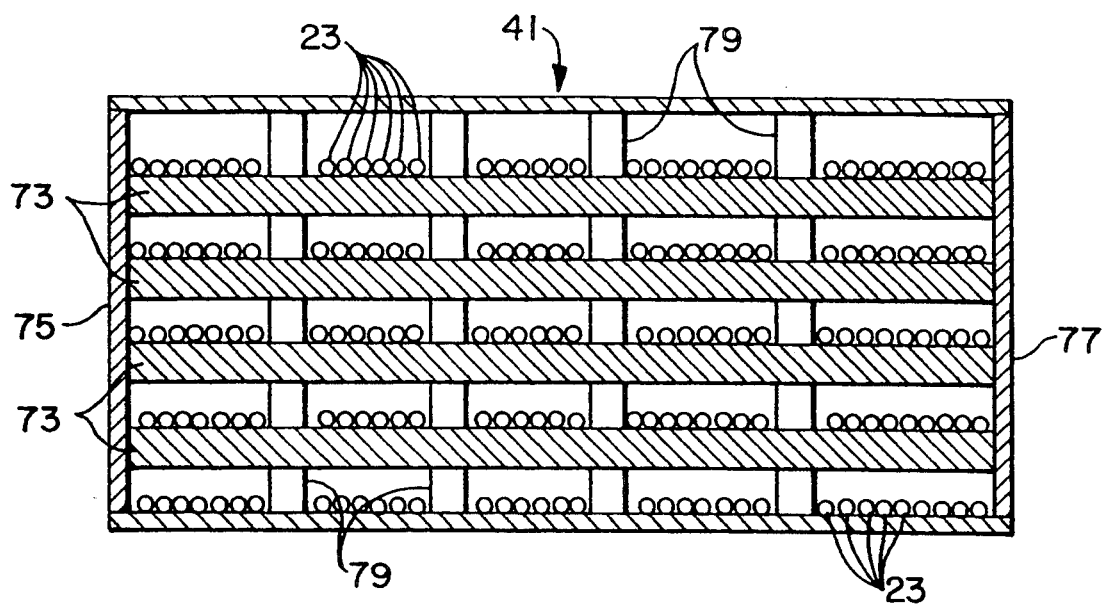
FIG. 5 is section through line 5—5 of FIG. 4.
Figure 6:
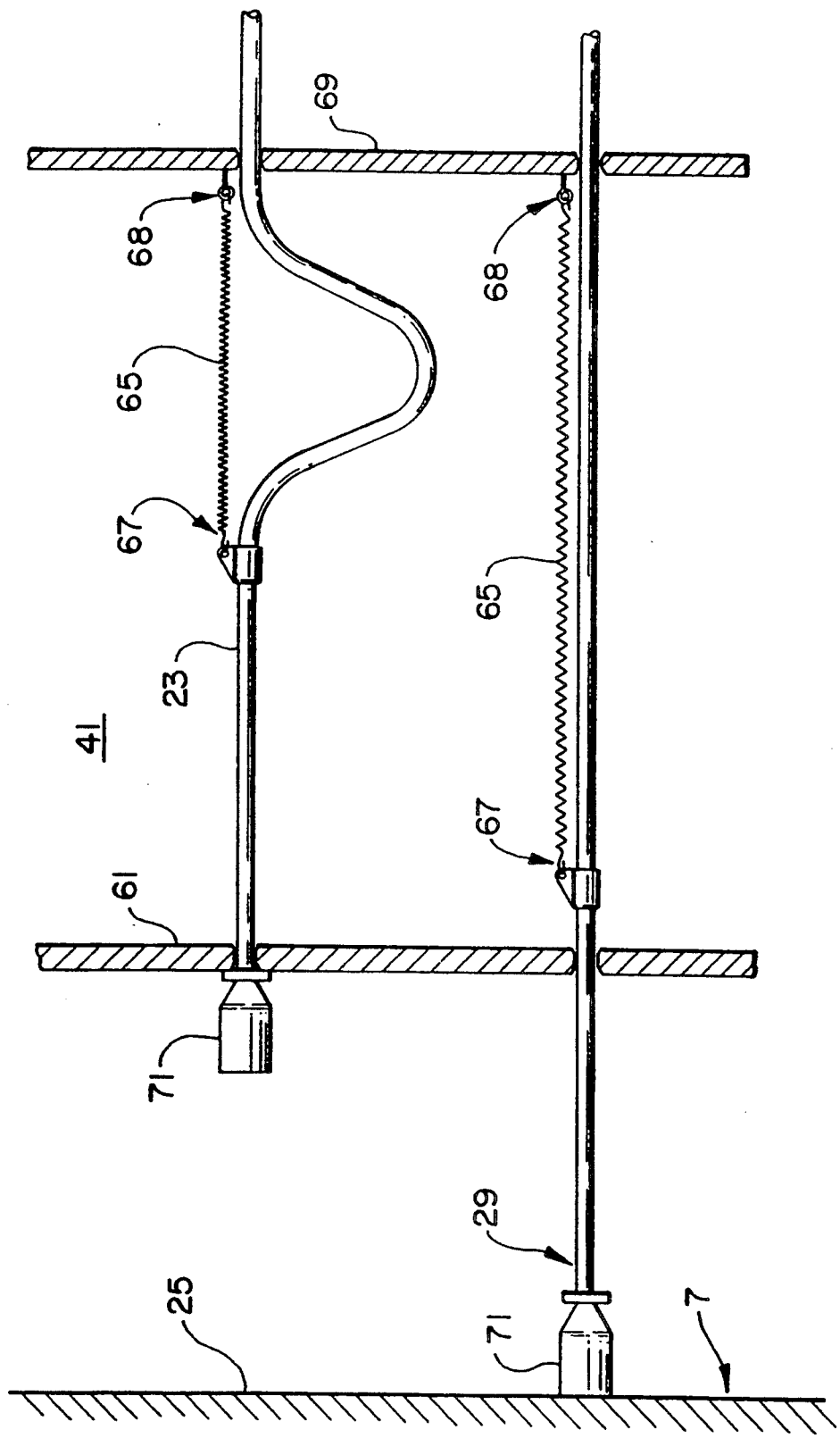
FIG. 6 is an illustration of a mechanism for retracting each cable when not connected to the IHP.

Referring now also to FIGS. 4–6, frame 41 preferably includes a connector plate 61 at a second end 63 opposite first end 51 and proximate head package 7 when frame 41 is in first position 43, and through which each of cables 23 pass in spaced relation. The frame can also advantageously include a retraction system for retracting the ends of the cables toward the connector plate after they are disconnected from the IHP. The retraction system can, for example, spring bias the cables or use counterweights to retract the cables. FIG. 6 illustrates a plurality of elongated tension springs 65, each having a first end 67 proximate connector plate 61 connected to a different one of the plurality of cables 23, and each having a second end 68 distal from connector plate 61 connected to a fixed member 69 within frame 41. The springs 65 bias each of cables 23 such that a connector 71 at first end 29 of each of cables 23 is retracted towards connector plate 61 when each of cables 23 is disconnected from head package 7.

Horizontal cross bars 73 extending between opposite sides 75 and 77 of frame 41, as illustrated in FIG. 5, provide support to at least some of the plurality of cables 23 between first end 51 of frame 41 and second end 63 of frame. Vertically arranged spacers 79 prevent crossing of at least some of cables 23 between first end 51 of frame 41 and second end 63 of frame 41.

First end 51 of frame 41 is preferably open such that cables 23 freely hang down out of frame 41 in all frame positions and extend in catenaries to control panels 33 at their second ends 35 (FIGS. 1–3). Removable cover plates (not shown) can be used, if desired, to cover opening 31 and provide more usable deck space when frame 41 is in second position 45 in sub-space 17.

A temporary platform 81 provides operator access to first ends 29 of cables 23 for connecting them to IHP 7 when frame 41 is in first position 43. A seismic holddown 83 of a type known in the art, such as a clevis arrangement, at top 47 of wall 5 latches to frame 41 and provides stability in the event of a strong vibration.

Whereas particular embodiments of the present invention have been described above for purposes of illustration, it will be appreciated by those skilled in the art that numerous variations of the details may be made without departing from the invention as described in the appended claims.

We claim:

1. A cabling arrangement for a plurality of cables, each removably connectable at a first end to a head package on a reactor vessel located in a containment, the containment characterized by a wall having a near side surrounding the reactor vessel and defining a cavity, an operating deck outside the cavity, a sub-space below the deck and on a far side of the wall spaced from the near side, and an operating area above the deck, and each of the cables having a second end located in the sub-space, the arrangement comprising:
   a movable frame supporting the cables which extends through the frame; and
   positioning means for moving the frame with the cables between a first position outside the sub-space proximate the head package and a second position in the sub-space.

2. The arrangement of claim 1, wherein the frame in the first position is oriented about horizontally and straddles a top of the wall, and in the second position is oriented about vertically proximate the far side of the wall.

3. The arrangement of claim 2, wherein the positioning means is characterized by:
   a pivot arrangement near a first end of the frame distal from the reactor vessel and overhanging the sub-space for permitting the frame to pivot between the first position and a substantially vertically oriented intermediate position; and
   guide means for guiding the frame between the intermediate position and the second position.

4. The arrangement of claim 3, wherein the guide means comprises a track fixed in an about vertical orientation proximate the far side of the wall and engaging the frame for movement of the frame along the track between the intermediate position and the second position.

5. The arrangement of claim 4, wherein the guide means further comprises motive means for lifting the frame from the second position to the intermediate position.

6. The arrangement of claim 5, wherein the motive means is powered by a system selected from the group consisting of an electric motor system, a hydraulic system, and a pneumatic system.

7. The arrangement of claim 2, wherein the frame comprises a first end distal from the head package in the first position, and a connector plate at a second end opposite the first end and through which each of the cables pass in spaced relation.

8. The arrangement of claim 7, wherein the frame further comprises retraction means for retracting the first ends of at least some of the cables towards the connector plate when the first ends are disconnected from the head package.

9. The arrangement of claim 8, wherein the retraction means includes spring bias means for spring biasing each of the at least some of the cables such that a connector at the first end of each of the at least some of the cables is retracted toward the connector plate when each of the at least at some of the cables is disconnected from the head package.

10. The arrangement of claim 9, wherein the spring bias means comprises a plurality of elongated tension springs, each connected at a first end proximate the connector plate to a different one of the at least some of cables and each connected at a second end distal from the connector plate to a fixed member within the frame.

11. The arrangement of claim 2, wherein the frame further comprises support means for providing support to at least some of the plurality of cables between the first end of the frame and the second end of the frame when the frame is in the first position.

12. The arrangement of claim 11, wherein the frame further comprises separation means for preventing crossing of at least some of the cables between the first end of the frame and the second end of the frame.

13. The arrangement of claim 12, wherein the separation means includes at least one vertical member within the frame.

14. A cabling arrangement for a reactor vessel located in a containment characterized by a wall having a near side surrounding the reactor vessel and defining a cavity, an operating deck outside the cavity, a sub-space below the deck and on a far side of the wall spaced from the near side, and an operating area above the deck, the arrangement comprising:
a movable cable carrier supporting a plurality of cables extending through the carrier, each of the cables connectable at a first end to a head package on the reactor vessel and each having a second end located in the sub-space, the carrier movable with the cables between a first position outside the sub-space spaced from and proximate the head package, oriented about horizontally and straddling a top of the wall, and a second position in the sub-space oriented about vertically proximate the far side of the wall, the carrier including:
a connector plate at a near end of the carrier overhanging the cavity and proximate the head package in the first position, comprising a plurality of channels through which each of the cables pass in spaced relation;
retraction means for retracting each of the cables such that a connector at the first end of each of the cables is retracted toward the connector plate when each of the cables is disconnected from the head package;
support means for providing support to at least some of the plurality of cables between the connector plate and a far end of the carrier and the second end of the carrier; and
spacer means for preventing crossing of at least some of the cables between the connector plate and the far end of the carrier; and
positioning means for moving the carrier between the first position and the second position, including:
a pivot arrangement near the far end of the carrier for pivoting the carrier between the first position and a substantially vertically oriented intermediate position; and
guide means for guiding the carrier along a predetermined path between the intermediate position and the second position, including a track fixed in an about vertical orientation proximate the far side of the wall and engaging the pivot arrangement.

15. The cabling arrangement of claim 14, wherein the support means includes a first fixed member extending between opposite sides of the carrier and the spacer means includes a second fixed member extending between an upper side and a lower side of the carrier.

16. The cabling arrangement of claim 14, wherein the retraction means includes a plurality of springs for biasing the first end of each of the cables towards the connector plate.

17. The cabling arrangement of claim 14, wherein the guide means includes motive means for raising the carrier between the second position and the intermediate position.

18. The cabling arrangement of claim 17, wherein the retraction means includes a plurality of springs for biasing the first end of each of the cables towards the connector plate.

19. The cabling arrangement of claim 18, wherein the support means includes a first fixed member extending between opposite sides of the carrier and the spacer means includes a second fixed member extending between an upper side and a lower side of the carrier.

* * * * *